United States Patent
Lee

(10) Patent No.: US 7,271,703 B2
(45) Date of Patent: Sep. 18, 2007

(54) 2-BIT BINARY COMPARATOR AND BINARY COMPARING DEVICE USING THE SAME

(75) Inventor: Yong-Sup Lee, Chungcheongbuk-do (KR)

(73) Assignee: Magnachip Semiconductor, Ltd., Heungduk-Gu, Cheongju-Si (KR)

( * ) Notice: Subject to any disclaimer, the term of this patent is extended or adjusted under 35 U.S.C. 154(b) by 234 days.

(21) Appl. No.: 11/071,407

(22) Filed: Mar. 2, 2005

(65) Prior Publication Data

US 2006/0022864 A1  Feb. 2, 2006

(30) Foreign Application Priority Data

Jul. 29, 2004  (KR) ...................... 10-2004-0059527

(51) Int. Cl.
  *G05B 1/00*  (2006.01)
  *G06F 7/02*  (2006.01)
(52) U.S. Cl. .................. 340/146.2; 326/54; 326/55
(58) Field of Classification Search ...................... None
  See application file for complete search history.

(56) References Cited

U.S. PATENT DOCUMENTS

| | | | | |
|---|---|---|---|---|
| 5,334,888 A | * | 8/1994 | Bodas | ........................ 326/54 |
| 5,391,938 A | * | 2/1995 | Hatsuda | ........................ 327/71 |
| 5,682,110 A | * | 10/1997 | Rountree | ........................ 327/108 |
| 5,742,224 A | * | 4/1998 | Gadducci et al. | ......... 340/146.2 |
| 5,929,654 A | * | 7/1999 | Park et al. | ..................... 326/58 |
| 6,081,130 A | * | 6/2000 | Cao et al. | ..................... 326/55 |
| 6,580,290 B1 | * | 6/2003 | Robinson | ..................... 326/57 |
| 6,686,776 B2 | * | 2/2004 | Sakata et al. | ................. 326/95 |
| 6,958,679 B1 | * | 10/2005 | Nguyen | ................... 340/146.2 |
| 6,960,937 B1 | * | 11/2005 | Nguyen | ..................... 326/58 |

FOREIGN PATENT DOCUMENTS

JP   60-263522   * 12/1985

* cited by examiner

*Primary Examiner*—Tuan T Lam
(74) *Attorney, Agent, or Firm*—Blakely, Sokoloff Taylor & Zafman

(57) ABSTRACT

A 2-bit binary comparator, including: a comparison unit for receiving a first bit and a second bit to thereby compare the first bit with the second bit; and an enable unit for outputting a comparison result of the comparison unit as an output of the 2-bit binary comparator according to an enable signal.

5 Claims, 3 Drawing Sheets

2-BIT BINARY COMPARATOR AND BINARY COMPARING DEVICE USING THE SAME

FIELD OF INVENTION

The present invention relates to a 2-bit binary comparator and a binary comparing device using the same to apply to digital logic circuit design.

DESCRIPTION OF PRIOR ART

A binary comparing device in digital logic circuit design may have various forms depending on designer's intension.

For example, FIG. 1 shows a typical binary comparing device in which a number of parallel-coupled exclusive NORs (XNORs) are ANDed. That is, the typical comparing device includes a first exclusive NOR gate 110 receiving two signals A0, B0, a second exclusive NOR gate 111 receiving two signals A1, B1, a third exclusive NOR gate 112 receiving two signals A2, B2, a fourth exclusive NOR gate 113 receiving two signals A3, B3, a first AND gate 115 receiving the outputs of the first and second exclusive NOR gates 110, 111, a second AND gate 116 receiving the outputs of the third and fourth exclusive NOR gates 112, 113, and a third AND gate 117 receiving the first and second AND gates 115, 116.

In such a binary comparing device, if the inputs of one or more XNOR gates are identical even though the entire bits do not coincide with each other when the respective input signals transit, the output signal levels of the coinciding XNOR gates transit so as to generate transition current and, accordingly, lead power consumption. Particularly, if the compared signal is a periodic recursive signal such as a count signal from a counter, there is power consumption due to transition current whenever the count signal changes though the entire bits do not coincide.

To solve such a problem, as shown in FIG. 2, there is introduced a 2-bit comparator for comparing two signals that are inputted only when an enable signal is applied (see FIG. 1 in U.S. Pat. No. 4,797,650).

The 2-bit comparator shown in FIG. 2 operates as will be described below. When a carry-in port 210 is "H", both of MOSFETs 211, 217 are turned on. When a first bit IN1 is low potential, a MOSFET 221 is turned off and a MOSFET 226 is turned on. When a second bit IN2 is "L", both of MOSFETs 220, 225 are turned off. Thus, a carry-out port 212 outputs the high potential on the IN2 BAR through the transistors 226, 217 so that the circuit can indicate coincidence of the bits.

On the contrary, when the second bit IN2 is "H", both of MOSFETs 220, 225 are turned on and low potential is applied on the IN2 BAR. Thus, the carry-out port 212 is to be connected to a ground voltage through three paths, i.e., the MOSFETs 226, 217, the MOSFETs 225, 217 and the MOSFETS 211, 220, so as to output a ground potential and finally indicate discordance of the bits exactly.

On the other hand, the 2-bit comparator such as in FIG. 2 uses 9 MOSFETs and one inverter. In other words, since the inverter should use two transistors, the 2-bit comparator should include 11 transistors, which leads large layout area.

Further, when the entire coincide in FIG. 1, operating speed is decreased due to a number of stages that the output signal should go through.

SUMMARY OF INVENTION

It is, therefore, an object of the present invention to provide a 2-bit binary comparator capable of reducing power consumption and layout area by using an enable signal.

It is another object of the present invention to provide a 2-bit binary comparator capable of improving operational speed.

In accordance with an aspect of the present invention, there is provided a 2-bit binary comparator, including: a comparison unit for receiving a first bit and a second bit to thereby compare the first bit with the second bit; and an enable unit for outputting a comparison result of the comparison unit as an output of the 2-bit binary comparator according to an enable signal.

In accordance with another aspect of the present invention, there is provided a binary comparing device, including: a first 2-bit binary comparator for logically combining a first and a second input signals by using a power voltage as an enable signal; and a second 2-bit binary comparator for logically combining a third and a fourth input signals by using the output of the first 2-bit binary comparator as an enable signal.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a 2-bit binary comparator in accordance with the present invention will be described in detail referring to the accompanying drawings.

A 2-bit binary comparator of the present invention further includes an enable port to perform a comparison operation when input signals of a previous stage 2-bit binary comparator coincide with each other. Accordingly, even if the input bits of the corresponding 2-bit binary comparator coincide with each other, the output of the comparator does not change when the input bits of the previous stage 2-bit binary comparator does not coincide with each other. Therefore, unnecessary transition current can be avoided. Further, since the output of the final stage comparator is the output of the entire comparator, the transfer delay can be improved.

There is provided Table 1 showing the truth table of a 2-bit binary comparator in accordance with the present invention.

TABLE 1

| EN | A | B | Z |
|----|---|---|---|
| 0  | X | X | 0 |
| 1  | 0 | 0 | 1 |
| 1  | 0 | 1 | 0 |

TABLE 1-continued

| EN | A | B | Z |
|----|---|---|---|
| 1  | 1 | 0 | 0 |
| 1  | 1 | 1 | 1 | where X means don't-care condition.

As can be seen in Table 1, the 2-bit binary comparator of the present invention operates as a typical XNOR gate only when an enable signal EN is applied but has no output Z if there is applied no enable signal EN. That is, when the enable signal is "0", the output signal maintains "0" state, constantly. When the enable signal is "1", the output signal has its state depending on logic state of two input signals. If the logic state of the two input signals are identical, "1" is outputted and, if other wise, "0" is outputted.

Figure 1:
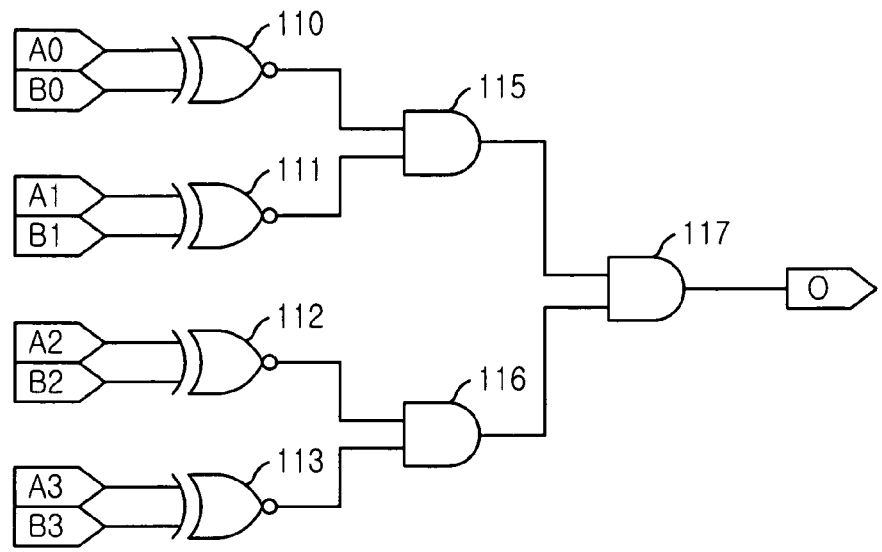
FIG. 1 is a typical binary comparing device.
Figure 2:
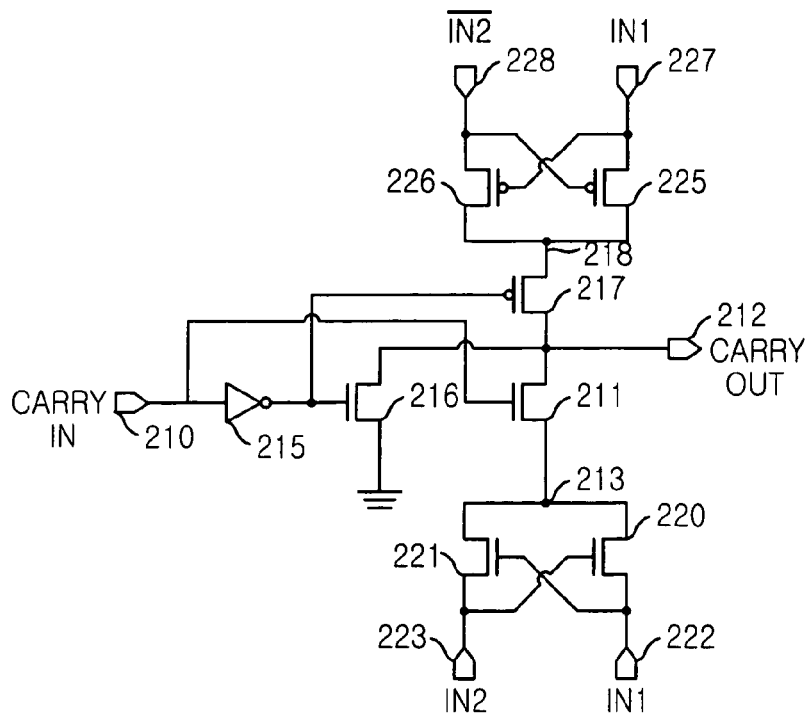
FIG. 2 is a 2-bit comparator.
Figure 3A:
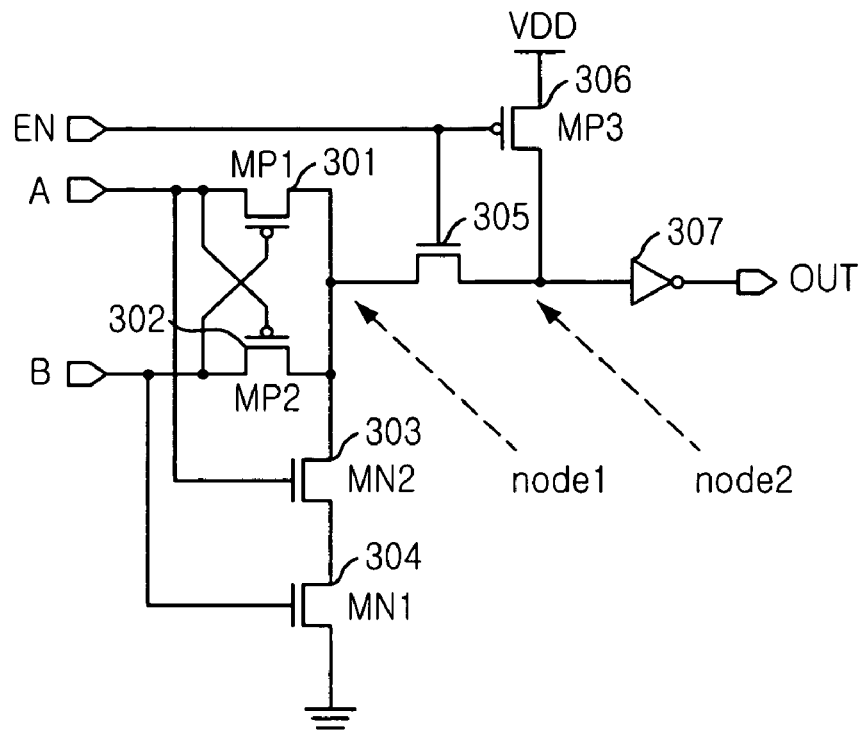
FIG. 3A is a detailed circuit diagram of a 2-bit binary comparator in accordance with the present invention.
Figure 3B:
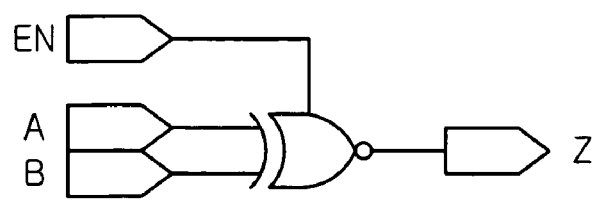
FIG. 3B represents symbols of FIG. 3A.

FIG. 3A is a detailed circuit diagram of a 2-bit binary comparator in accordance with the present invention and FIG. 3B represents symbols of FIG. 3A.

It will be described for construction and operation of the 2-bit binary comparator of the present invention.

Sources of a first and a second P-channel MOSFETs 301, 302 are coupled to input ports A, B, respectively. The gate of the first P-channel MOSFET 301 is coupled to the source of the second P-channel MOSFET 302 and the gate of the second P-channel MOSFET 302 is coupled to the source of the first P-channel MOSFET 301. Drains of the first and second P-channel MOSFETs 301, 302 are coupled to a first node Node1.

Further, a first and a second N-channel MOSFETs 303 and 304 are serially coupled to each other. The first N-channel MOSFET 303 has a first terminal coupled to a first node Node1 and a second terminal coupled to a first terminal of the second N-channel MOSFET 304. A second terminal of the second N-channel MOSFET 304 is coupled to a ground voltage. The first and second N-channel MOSFETs 303, 304 are controlled with the input signals A and B respectively.

A third N-channel MOSFET 305 is controlled with the enable signal EN and has a source coupled to the first node Node1 and a drain coupled to a second node Node2. A third P-channel MOSFET 306 is controlled with enable signal EN and has a source coupled to a power voltage Vdd and a drain coupled to the second node Node2. An inverter 307 inverts the logic value of the second node Node2.

When the enable signal is "0", the third N-channel MOSFET 305 is turned off and the third P-channel MOSFET 306 is turned on to make the second node Node2 "1" so as to make the output Z "0".

When the enable signal is "1", the third N-channel MOSFET 305 is turned on and the third P-channel MOSFET 306 is turned off so that the output Z is determined depending on the logic level of the first node Node1. For example, if both of the two input signal A, B are "0", both of the first and second P-channel MOSFETs 301, 302 are turned on and both of the first and second N-channel MOSFETs 303, 304 are turned off to make the first node Node1 "0" so as to make the output Z "1". Otherwise, if the two input signals A, B are "1" and "0", respectively, the first P-channel MOSFET 301 is turned on, the second P-channel MOSFET 302 is turned off, the first N-channel MOSFET 303 is turned off and the second N-channel MOSFET 304 is turned on to make the first node Node1 "1" so as to make the output Z "0". On the other hand, if both of the two input signals A, B are "1", both of the first and second P-channel MOSFETs 301, 302 are turned off and the first and second N-channel MOSFETs 303, 304 are turned on to make the first node Node1 "0" so as to make the output Z "1".

Figure 4:
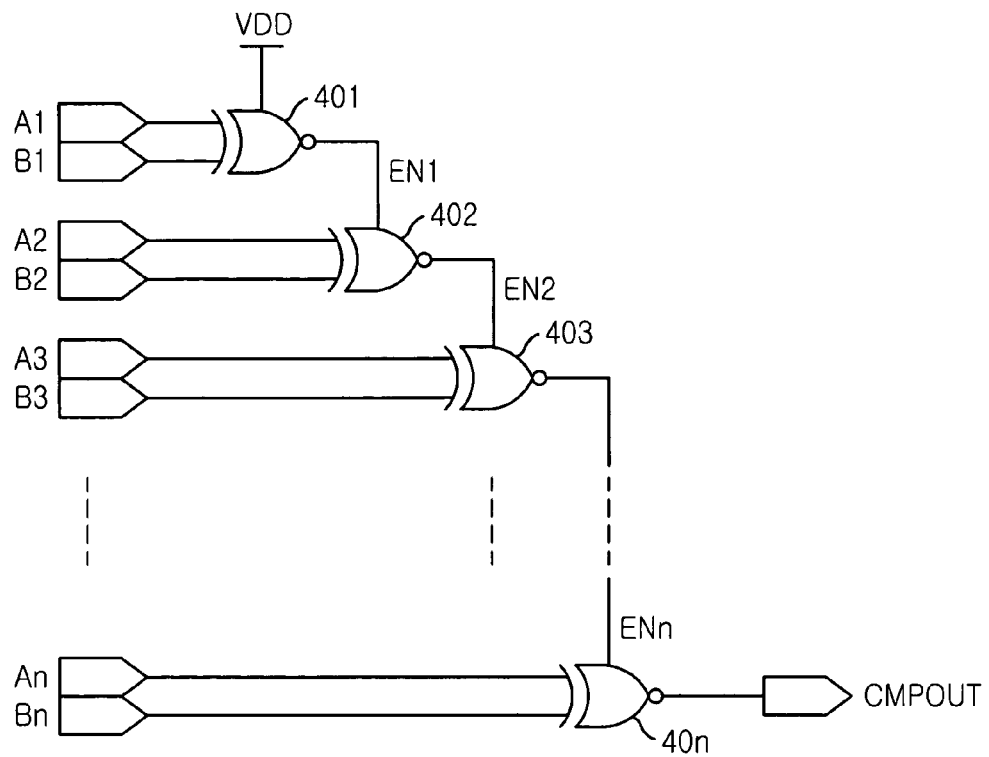
FIG. 4 is a binary comparing device in accordance with present invention.

FIG. 4 is a binary comparing device in accordance with present invention.

The binary comparing device of the present invention includes a first 2-bit binary comparator 401 enabled by the power voltage for logically combining a first and a second input signals, and a second 2-bit binary comparator 402 enabled by the output of the first 2-bit binary comparator 401 for logically combining a third and a fourth input signals.

It will be described for the operation of the binary comparing device as shown in FIG. 4.

When the logic state of the first and second input signals coincide with each other, the first 2-bit binary comparator 401 outputs "1". The second 2-bit binary comparator 402 outputs "1" when the third and fourth input signals coincide with each other by using the output of the first 2-bit binary comparator 401 as an enable signal. Further, a third to a N-th 2-bit binary comparators 403, . . . , 40N operate as similar as the second 2-bit binary comparator 402. Accordingly, the number of transitions of the entire comparators is reduced to decrease power consumption. Particularly, if the input signals are provided from a recursive up/down-counter, the optimal operation can be obtained. That is, assuming the up-counter be used, if the most significant bit is inputted to the first 2-bit binary comparator, the second significant bit to the second 2-bit binary comparator and so on, the final output can be obtained after minimal N times of comparator transition operations since the input values changes from the most significant bit to the least significant bit. From this, fast comparison can be accomplished.

Figure 5:
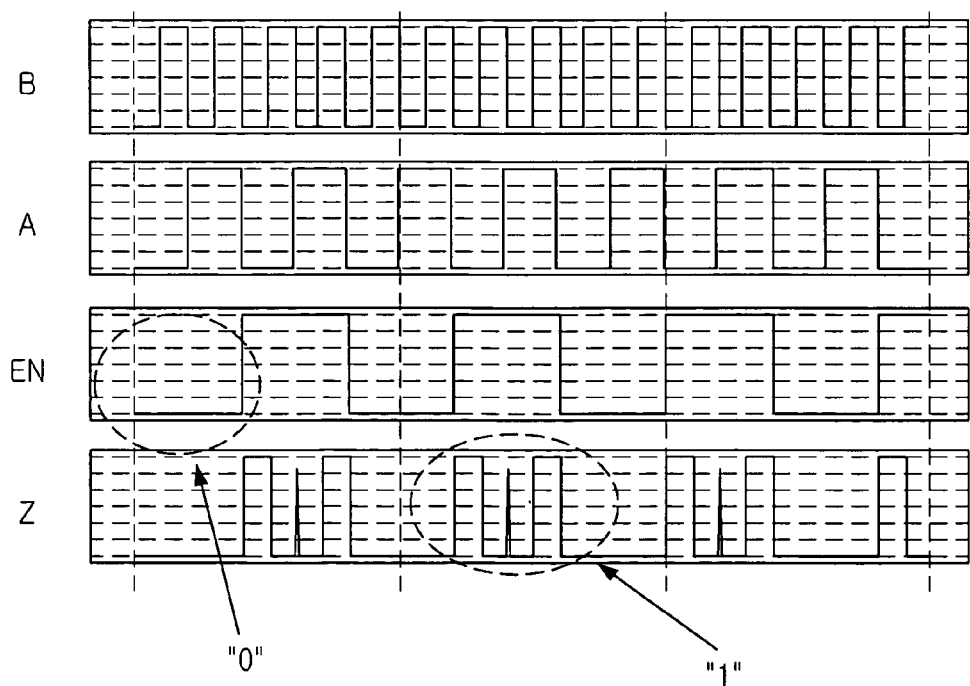
FIG. 5 is a simulation waveform diagram of a 2-bit binary comparator in accordance with the present invention.

FIG. 5 is a simulation waveform diagram of a 2-bit D binary comparator in accordance with the present invention.

As can be seen, when the enable signal EN is "0", the output is "0", and when the enable signal EN is "1", the output exists.

As described above, by using the enable signal, the present invention can avoid unnecessary transition current and accordingly reduce power consumption. Further, by forming the 2-bit binary comparator with 6 transistors and one inverter, i.e., 8 transistors, the circuit area can be reduced. Further, the 2-bit binary comparing device of the present invention can improve operational speed with improved transfer delay.

The present application contains subject matter related to the Korean patent application No. KR 2004-59527, filed in the Korean Patent Office on Jul. 29, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A binary comparing device, comprising:
   a first 2-bit binary comparator for logically combining a first and a second input signals by using a power voltage as an enable signal; and
   a second 2-bit binary comparator for logically combining a third and a fourth input signals by using the output of the first 2-bit binary comparator as an enable signal.

2. The binary comparing device as recited in claim 1, wherein each 2-bit binary comparator includes:
   a comparison unit for receiving a first bit and a second bit to thereby compare the first bit with the second bit; and an enable unit for outputting a comparison result of the comparison unit as an output of each 2-bit binary comparator according to each enable signal.

3. The binary comparing device as recited in claim 2, wherein the comparison unit includes:
   a first and a second input ports for receiving the first bit and the second bit;
   a first and a second PMOS transistors, the first PMOS transistor having a source coupled to the first input port, a gate coupled to a source of the second PMOS transistor and a drain coupled to a first node, the second PMOS transistor having a source coupled to the second input port, a gate coupled to the source of the first PMOS transistor and a drain coupled to the first node; and
   a first and a second NMOS transistors, the first NMOS transistor controlled with the first input port and having a first terminal coupled to the first node and a second terminal coupled to a first terminal of the second NMOS transistor, the second NMOS transistor controlled with the second input port and having a second terminal coupled to a ground voltage.

4. The binary comparing device as recited in claim 3, wherein the enable unit includes:
   an enable signal input port for receiving the enable signal;
   a third NMOS transistor controlled with the enable signal and having a source coupled to the first node and a drain coupled to a second node; and
   a third PMOS transistor controlled with the enable signal and having a source coupled to a power voltage and a drain coupled to the second node.

5. The binary comparing device as recited in claim 4, further comprising an inverter for inverting the logic value of the second node.

* * * * *